(12) United States Patent
Miyamori (10) Patent No.: US 7,436,983 B2
(45) Date of Patent: Oct. 14, 2008

(54) IMAGE RECOGNITION APPARATUS AND IMAGE RECOGNITION PROGRAM

(75) Inventor: Hisashi Miyamori, Tokyo (JP)

(73) Assignee: National Institute of Information and Communications Technology Incorporated Administrative Agency, Tokyo (JP)

( * ) Notice: Subject to any disclaimer, the term of this patent is extended or adjusted under 35 U.S.C. 154(b) by 819 days.

(21) Appl. No.: 10/523,261

(22) PCT Filed: Jul. 31, 2002

(86) PCT No.: PCT/JP02/07826

§ 371 (c)(1),
(2), (4) Date: Jan. 27, 2005

(87) PCT Pub. No.: WO2004/013812

PCT Pub. Date: Feb. 12, 2004

(65) Prior Publication Data

US 2005/0254685 A1    Nov. 17, 2005

(51) Int. Cl.
*G06K 9/00* (2006.01)
*A63F 13/00* (2006.01)
*G06G 5/00* (2006.01)

(52) U.S. Cl. .......................... 382/107; 463/31; 345/156

(58) Field of Classification Search ................. 382/107, 382/100, 276, 293; 345/4, 589, 600, 629, 345/473, 156; 348/172, 25; 463/4, 31, 36, 463/20, 8, 16, 1; 434/757, 251; 700/94
See application file for complete search history.

(56) References Cited

U.S. PATENT DOCUMENTS 5,423,554 A * 6/1995 Davis .............................. 463/4

5,802,220 A * 9/1998 Black et al. .................. 382/276

(Continued)

FOREIGN PATENT DOCUMENTS

JP          09-313660          12/1997

(Continued)

OTHER PUBLICATIONS

European Search Report dated Jun. 6, 2006, Application No. 02755732.1-2218.

(Continued)

*Primary Examiner*—Andrew W. Johns
*Assistant Examiner*—Andrae S Allison
(74) *Attorney, Agent, or Firm*—Westerman, Hattori, Daniels & Adrian, LLP.

(57) ABSTRACT

An image recognition apparatus is configured to recognize movements of players in a sport match or game from contents recording a sport match or game wherein the players match against each other between domains partitioned with such an obstacle as net, the image recognition apparatus including: a picture information obtaining section configured to obtain picture information containing an image of a movement of at least one of the players from the contents; a sound information obtaining section 103 configured to obtain sound information generated in synchronism with the picture information from the contents, the sound information including information on a hitting sound generated upon hitting of such an instrument as a ball moving between the domains; a hitting time information specifying section 105 configured to specify a hitting time at which the instrument is hit based on the sound information; a rule information storage section 102 configured to store rule information for carrying out the sport match or game; and an image substance recognizing section 106 configured to recognize a substance of an image containing the image of the movement of the player provided by the picture information based on the picture information, a position of the instrument at the specified hitting time and the rule information.

14 Claims, 11 Drawing Sheets

U.S. PATENT DOCUMENTS

| | | | | |
|---|---|---|---|---|
| 5,882,204 | A * | 3/1999 | Iannazo et al. | 434/251 |
| 6,071,002 | A * | 6/2000 | Katayama | 434/257 |
| 6,081,619 | A * | 6/2000 | Hashimoto et al. | 382/181 |
| 6,183,259 | B1 * | 2/2001 | Macri et al. | 434/247 |
| 6,256,047 | B1 * | 7/2001 | Isobe et al. | 345/473 |
| 6,663,491 | B2 * | 12/2003 | Watabe et al. | 463/36 |
| 7,148,913 | B2 * | 12/2006 | Keaton et al. | 348/169 |
| 7,160,191 | B2 * | 1/2007 | Matsumoto | 463/31 |
| 7,300,345 | B2 * | 11/2007 | Mifune et al. | 463/4 |

FOREIGN PATENT DOCUMENTS

JP     11-339009     12/1999

OTHER PUBLICATIONS

Hisashi Miyamori, Information Processing Society of Japan Kenkyu Hokoku, vol. 2002, No. 26, pp. 89-94, Mar. 8, 2002. Cited in the int'l. search report.

\* cited by examiner

| RULE INFORMATION INDEX | RULE INFORMATION |
|---|---|
| SERVICE | THE SERVER STANDS REARWARDLY OF THE BASE LINE AWAY FROM THE NET WITH HIS OR HER BOTH FEET ON THE GROUND BETWEEN IMAGINARY EXTENSIONS OF RESPECTIVE OF THE CENTER MARK AND A SIDE LINE. THE SERVER THROWS A BALL UP INTO THE AIR IN ANY DIRECTION AND THEN HITS THE BALL BEFORE FALLING TO THE GROUND WITH THE RACKET. THE SERVICE IS CONSIDERED TO HAVE BEEN COMPLETED AT THE MOMENT THE RACKET AND THE BALL CONTACT EACH OTHER. |
| FALL OF THE BALL ON A COURT LINE | THE BALL HAVING FALLEN ON A COURT LINE IS CONSIDERED TO HAVE FALLEN TO THE GROUND WITHIN THE COURT DELIMITED BY THE COURT LINE. |
| ⋮ | ⋮ |

Fig.10

BACKHAND STROKE MOTION    SMASH MOTION

IMAGE RECOGNITION APPARATUS AND IMAGE RECOGNITION PROGRAM

TECHNICAL FIELD

The present invention relates to an image recognition apparatus capable of advantageously recognizing even the substance of an image included in sports-related contents, such as a sport program telecasted, which has been conventionally difficult to recognize.

BACKGROUND ART

With the growth of the Internet society in recent years, computer equipment, communications environment and interfaces have become capable of operating at higher speeds in broader bands and, hence, the amount of user-accessible digital picture information is increasing steadily in various fields; for example, various types of picture data are being accumulated in large amount here and there. Increasing importance has been attached to the art of accessing such massive amounts of information and quickly searching for a desired portion of a picture.

For a user to extract a user's desired image from a scene of a sport picture of, for example, tennis, methods of recognizing the substance of an image, such as "successful passing shot" and "successful smash", are conceivable to be adopted. Such methods include methods of recognizing the substance of such an image by manually inputting a "successful passing shot" section, a "successful smash" section and a like section of picture information one by one, or by extracting positions of respective of a ball, players and court lines and totally judging a change with time in spatial correlations among the extracted positions with use of a computer.

The method of image recognition based on manual input, however, involves a problem of increased labor costs and a problem of heavy burden on the operators which arises when the contents processing takes a long time, though the substance of an image can be reliably recognized. On the other hand, the method of automatic image recognition with a computer has such an inconvenience that if picture information is the only subject for processing, a failure occurs to trace a ball when the ball is overlapped or hidden by a player, net or the like, so that an important position and time cannot be specified in a portion of picture information, thus resulting in a failure to detect an event to be recognized or in erroneous image recognition.

DISCLOSURE OF INVENTION

In order to solve the foregoing problems the present invention provides the following means.

That is, the present invention provides an image recognition apparatus for recognizing movements of players matched against each other between domains partitioned with such an obstacle as net in a sport match or game from contents including a television program being telecasted to show the sport match or game, an image material in an uncompleted state for broadcasting and contents recorded in such a recording medium as a VTR, the image recognition apparatus comprising: an picture information obtaining section configured to obtain picture information containing an image of a movement of at least one of the players playing in the sport match or game from the contents; a sound information obtaining section configured to obtain sound information generated in synchronism with the picture information from the contents, the sound information including information on a hitting sound generated upon hitting of such an instrument as a ball moving between the domains to serve as an object of score count in the sport match or game; a hitting time information specifying section configured to specify a hitting time at which the instrument is hit based on the sound information obtained by the sound information obtaining section; a rule information storage section configured to store rule information for carrying out the sport match or game; and an image substance recognizing section configured to recognize a substance of an image containing the image of the movement of the player provided by the picture information based on the picture information obtained by the picture information obtaining section, a position of the instrument at the hitting time specified by the hitting time specifying section and the rule information stored in the rule information storage section.

With this configuration, even when image recognition based on the picture information only is difficult; for example, when the position of the instrument is difficult to specify due to the instrument overlapped or hidden by a player or such an obstacle as net, the hitting time information specifying section specifies the time of the generation of a hitting sound based on the sound information including information on the hitting sound obtained by the sound information obtaining section and then the image substance recognizing section identifies a movement of a player playing in a sport match or game reliably based on the specified hitting time, the picture information including the image of the player's movement and the rule information for carrying out the sport match or game. Thus, the image recognition apparatus provided by the present invention is capable of superior image recognition without any error in recognizing, for example, a forehand swing, a backhand swing and an overhead swing due to the instrument overlapped or hidden.

Methods of specifying a hitting time include a method wherein when the sound information assumes a value higher than a predetermined level, the hitting time information specifying section specifies as the hitting time a point in time at which the higher value is assumed.

To eliminate noise contained in the sound information except the hitting sound, it is desirable that the sound information obtaining section be provided with a filter portion configured to permit sound within a predetermined frequency band to pass therethrough, wherein the sound information is information on the sound having passed through the filter portion. To advantageously eliminate environmental sound including a sound generated when the shoes of a player rub the court during play, a sound of wind and other noises, it is desirable that the filter portion comprise a band-pass filter.

To specify the hitting time more efficiently, it is preferable that the hitting time information specifying section is configured to specify the hitting time based on hitting sound prospect data including data on a predetermined time period within which the hitting sound extracted from the sound information is generated.

To extract the hitting time reliably, the hitting time information specifying section may be configured to extract plural hitting sound prospect data items from the sound information in such a manner that a hitting sound prospect data item generated at one point in time and a subsequent hitting sound prospect data item generated at a succeeding point in time share data on a same time and then specify the hitting time based on the plural hitting sound prospect data items. In this case, if the plural hitting sound prospect data items have equal data length while the hitting time information specifying section is configured to extract the plural hitting sound prospect data items from the sound information at constant time intervals, the hitting sound can be extracted efficiently.

To extract the time of the generation of the hitting sound more reliably, it is desirable that the image recognition apparatus further comprise a hitting sound pattern information storage section configured to store hitting sound pattern information including information on patterns of sound changes that occur depending on how the instrument is hit by such an instrument as a racket constantly held and used by each of the players, wherein the hitting time information specifying section is configured to specify the hitting time based on the hitting sound pattern information stored in the hitting sound pattern information storage section and the sound information.

To extract a characteristic movement of each player from the contents, it is preferable that the picture information obtaining section includes a domain element extracting section configured to extract from the picture information facility information including information on the obstacle, information on the domains and information on boundary lines between each of the domains and an area outside the domain, player's position information indicative of a player's position, and instrument information on the instrument moving between the domains to serve as an object of score count in the sport match or game.

To extract players' characteristic movements from the contents more efficiently, it is desirable that the player's position information be position information on a domain containing each of the players and the instrument constantly held and used by the player.

In a specific embodiment of the present invention for extracting the player's position information from the picture information, the domain element extracting section is configured to extract the player's position information from the picture information based on the facility information extracted by the domain element extracting section. In a specific embodiment of the present invention for extracting the instrument information from the picture information, the domain element extracting section is configured to extract the instrument information from the picture information based on the facility information and the player's position information extracted by the domain element extracting section.

To extract a contents element related to a sport of concern suitably, it is desirable that the facility information, the player's position information, the instrument information and the rule information be based on knowledge about a sport as a subject for image extraction.

BEST MODE FOR CARRYING OUT THE INVENTION

Hereinafter, one embodiment of the present invention will be described with reference to the drawings.

Figure 1:
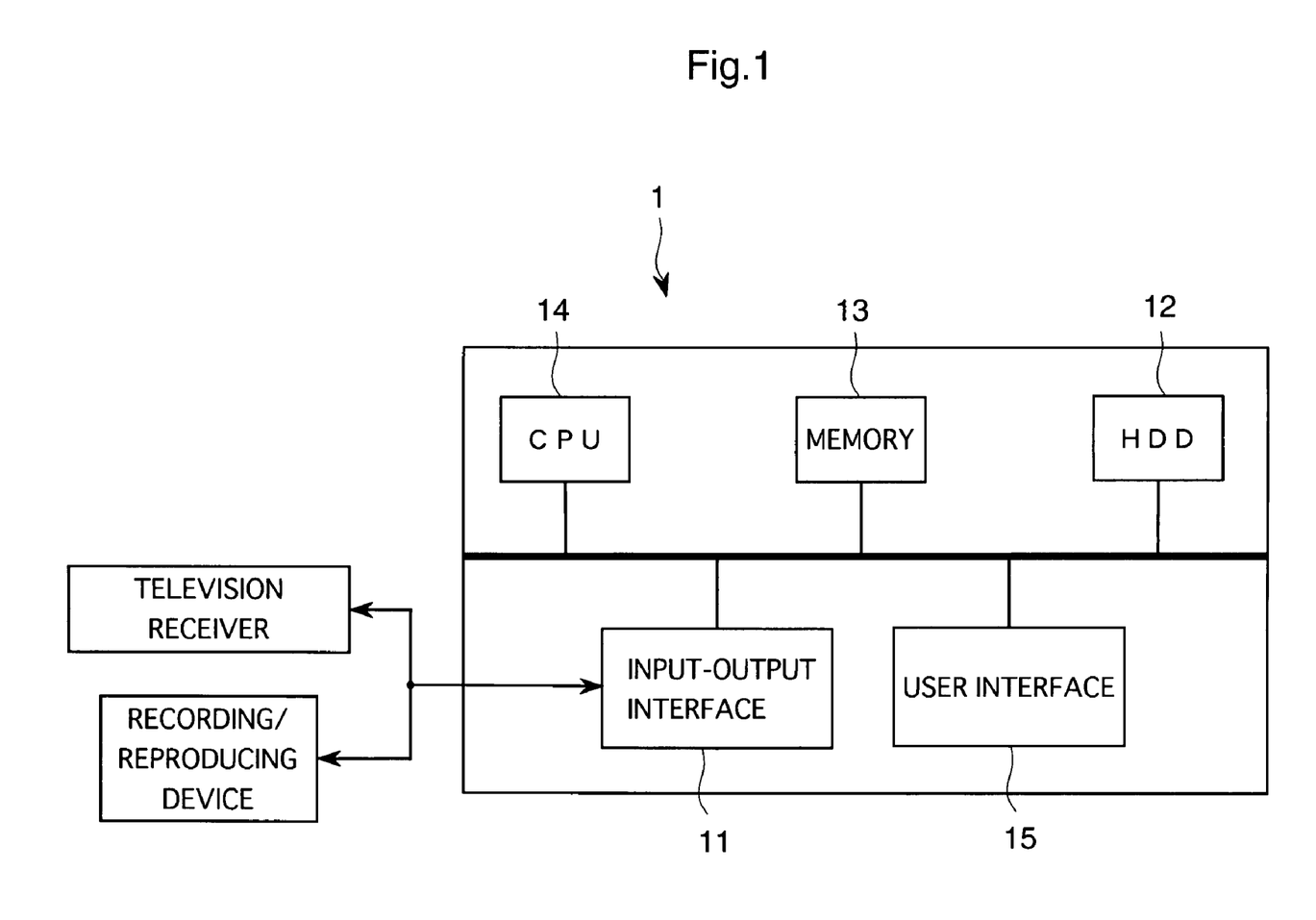
FIG. 1 is a diagram showing the device configuration of an image recognition apparatus according to an embodiment of the present invention.
Figure 2:
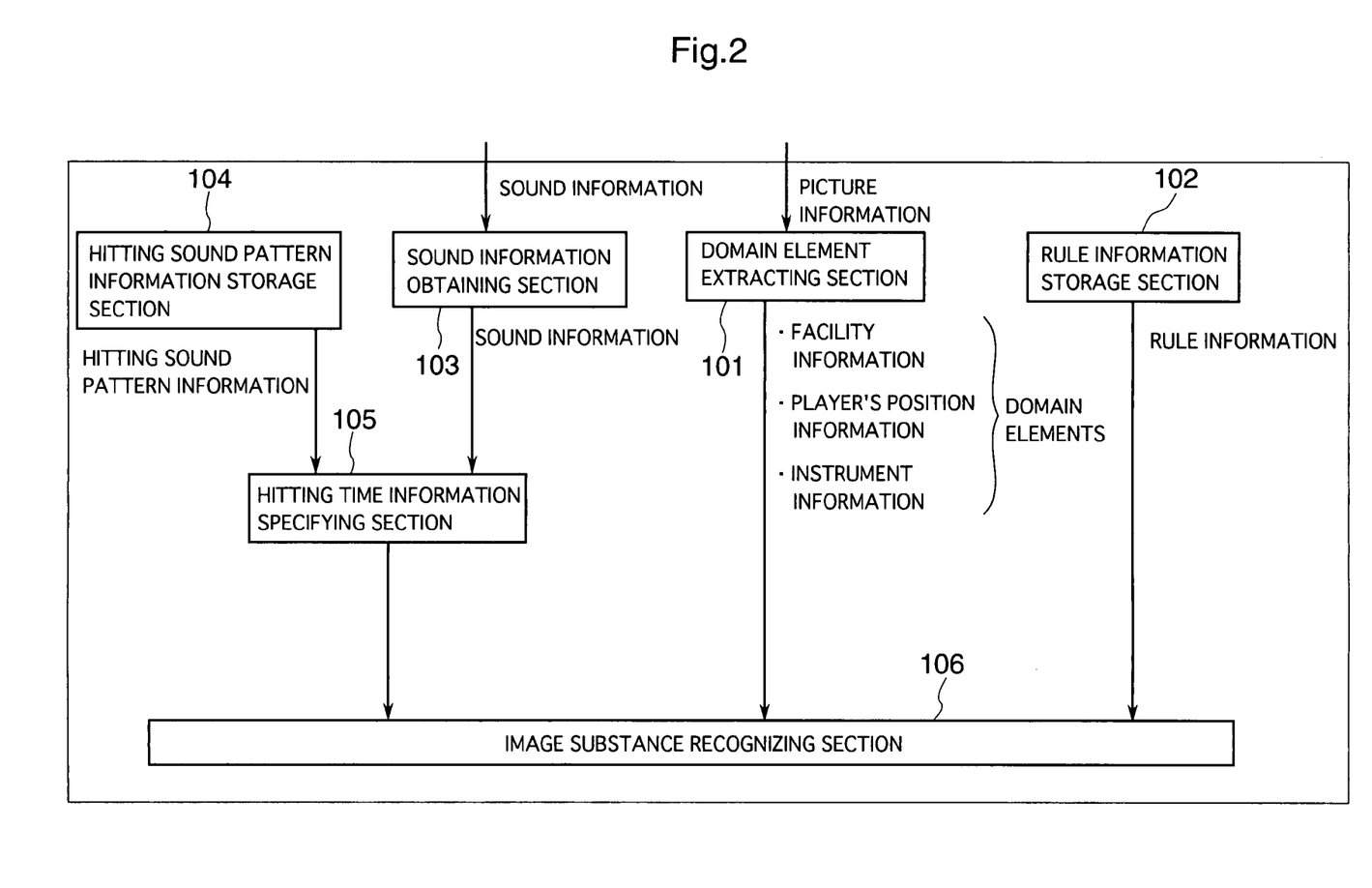
FIG. 2 is a function block diagram of the embodiment.

FIG. 1 is a diagram showing the device configuration of an image recognition apparatus according to an embodiment of the present invention. FIG. 2 is a function block diagram of the embodiment.

The image recognition apparatus according to this embodiment is configured to recognize characteristic movements of players playing in a sport match or game from sports contents including a television program being telecasted on a television receiver TV or being reproduced by a recording/reproducing device such as a VTR, and such contents as recorded in a recording medium. As shown in FIG. 1, the image recognition apparatus includes, as major components thereof, an input-output interface 11 connected to the television receiver TV and the recording/reproducing device such as a VTR, an external storage device 12 and internal memory 13, such as HDD or the like, for storing data, programs and the like, a CPU 14 configured to operate according to a program stored in the external storage device 12 or the like to cause the apparatus to function as image recognition apparatus 1, a user interface 15 comprising a keyboard and a mouse for receiving user information about the user, and a like component. The "contents", as used herein, is meant to include pictures including images of movements of players, a shot taken at such an angle to view a court from obliquely above along the length of the court and a close-up shot of a judge or a spectator, and sound including voice of a commentator and the like. In this embodiment, reference is made to a tennis program as an exemplary one of the "contents".

In a functional aspect, the image recognition apparatus 1 has functions as a domain element extracting section 101, a rule information storage section 102, a sound information obtaining section 103, a hitting sound pattern information storage section 104, a hitting time information specifying section 105, an image substance recognizing section 106, and a like section, as shown in FIG. 2, which functions are fulfilled by the operations of the CPU 14 and the like.

These sections will be described in detail.

The domain element extracting section 101 is configured to extract from picture information provided by a television receiver facility information including information on such an obstacle as net, information on a court as partitioned domains, and information on court lines as boundary lines between the court and an area outside the court, player's position information indicative of the position of each player, and instrument information on an instrument moving between half-courts to serve as an object of score count in a sport match or game of concern. The domain element extracting section 101 is designed to fulfill a part of the function of a picture information obtaining section configured to obtain the picture information containing images of movements of at least one player playing in the sport match or game from the contents. In this embodiment, the facility information to be extracted comprises information on the court lines and information on the net lines; the player's position information to be extracted comprises position information on each of players 1 and 2 matched against each other; and the instrument information to be extracted comprises information on a tennis ball (hereinafter will be referred to as "ball"). The facility information, player's position information and instrument information extracted by the domain element extracting section will be generally referred to as domain elements.

Figure 3:
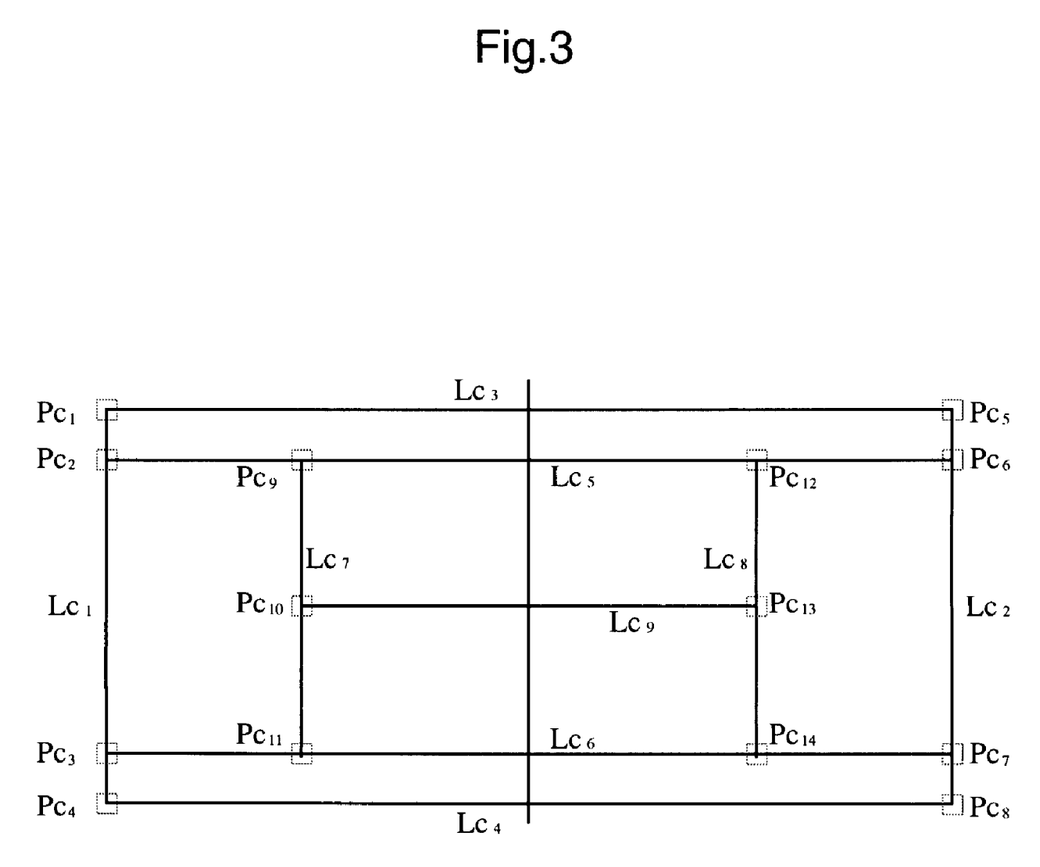
FIG. 3 is a diagram illustrating a court model for use in extracting court lines from picture information according to the embodiment.
Figure 4:
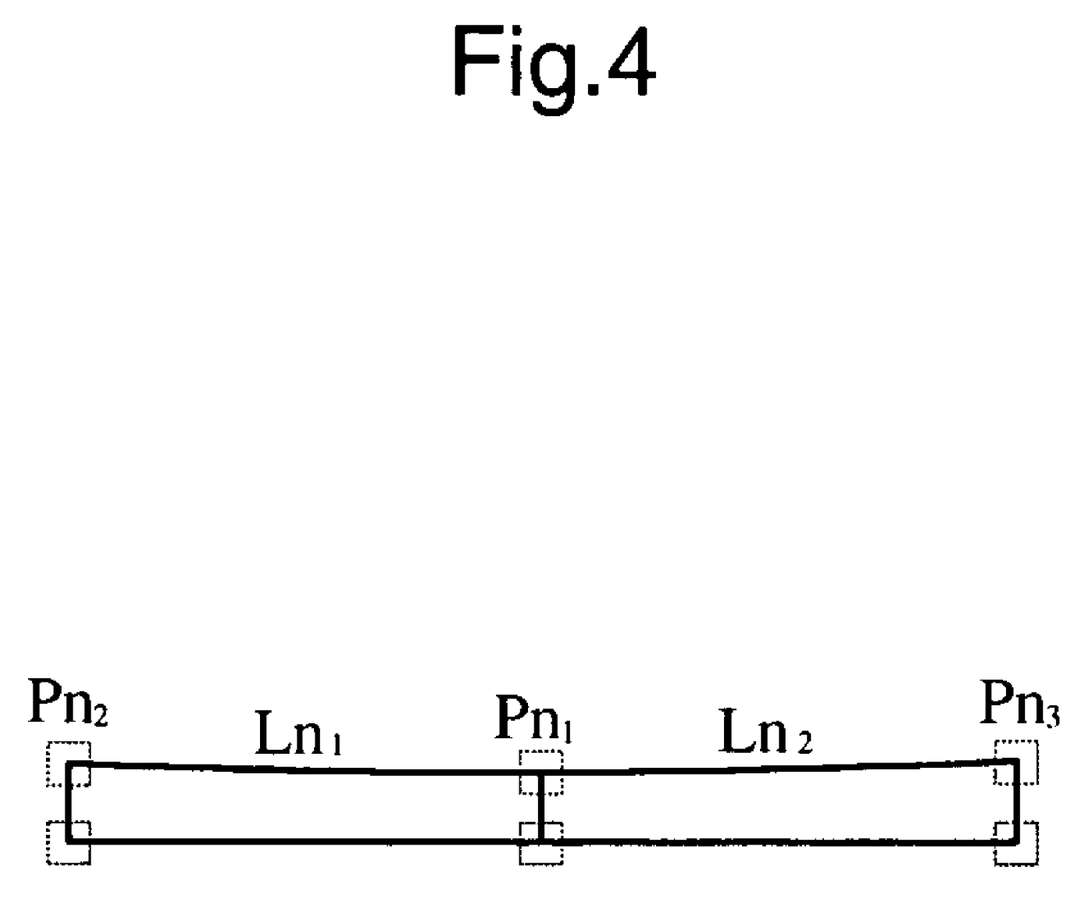
FIG. 4 is a diagram illustrating a net model for use in extracting net lines from picture information according to the embodiment.

More specifically, in extracting the facility information, information on the court lines and information on the net lines are extracted in this order from the picture information by reference to a court model specifying court characteristic points $Pc_1, \ldots, Pc_{14}$ (hereinafter will be generally referred to as "Pc") as representative points on the court lines and court lines $Lc_1, \ldots, Lc_9$ (hereinafter will be generally referred to as "Lc") as shown in FIG. 3 and a net model specifying net characteristic points $Pn_1, \ldots, Pn_3$ (hereinafter will be generally referred to as "Pn") as representative points on the net lines and net lines $Ln_1$ and $Ln_2$ (hereinafter will be generally referred to as "Ln") as shown in FIG. 4.

First, the court lines are extracted from the picture information by detecting the court characteristic points. More specifically, at a point in time t=0, initial characteristic points Pc(0) are given as inputs; each of court lines Lc(0) determined by the characteristic points Pc(0) are transformed into a Hough plane; and then a detection window Wc(0) having dimensions $W_{th}$ and $W_{ro}$ is provided about each peak point on the Hough plane. At a point in time t=t, first, a binary image B(t) of an original image and an area around court lines Lc(t−1) are ANDed to generate a binary image Bc(t) comprising only the area around the court (hereinafter will be referred to as "court line binary image"). Subsequently, the process steps of: subjecting this binary image to Hough transformation line by line; performing peak detection within the range limited by each detection window Wc(t−1); updating the court characteristic points Pc(t); subjecting court lines Lc(t) to Hough transformation again; and updating detection windows Wc(t), are performed to extract the court lines from the picture information. If a certain court characteristic point is positioned out of the screen due to panning or the like, update is achieved by estimating the position of the point outside the screen based on connecting knowledge on the assumption that court characteristic points $Pc_i(t)$ (i=9, 10, 12, 13, or 10, 11, 13, 14) in a central area of the court are constantly displayed on the screen. For the same reason, some of initial characteristic points may be omitted. The "connecting knowledge" is knowledge defined based on such knowledge used in doing a sport of concern that connecting court characteristic points $Pc_i(t)$ (i=9, 10, 12, 13) for example with each other in the central area of the court allows a zone that can have a meaning to be defined on the court model.

Subsequently, the net lines are extracted from the picture information by the following process steps: at a point in time t=0, initial characteristic points Pn(0) are given as inputs; a net line Ln(0) and a detection window Wn(0) are provided for each line in the same manner as with the court lines; at a point in time t=t, an image Bn(t)=B(t)−Bc(t), which is a binary image formed by removing the court line binary image from the binary image of the original image, is generated as a net line binary image; this binary image is then subjected to Hough transformation; peak detection is performed within each detection window; and the characteristic points Pn(t) are updated.

Figure 5:
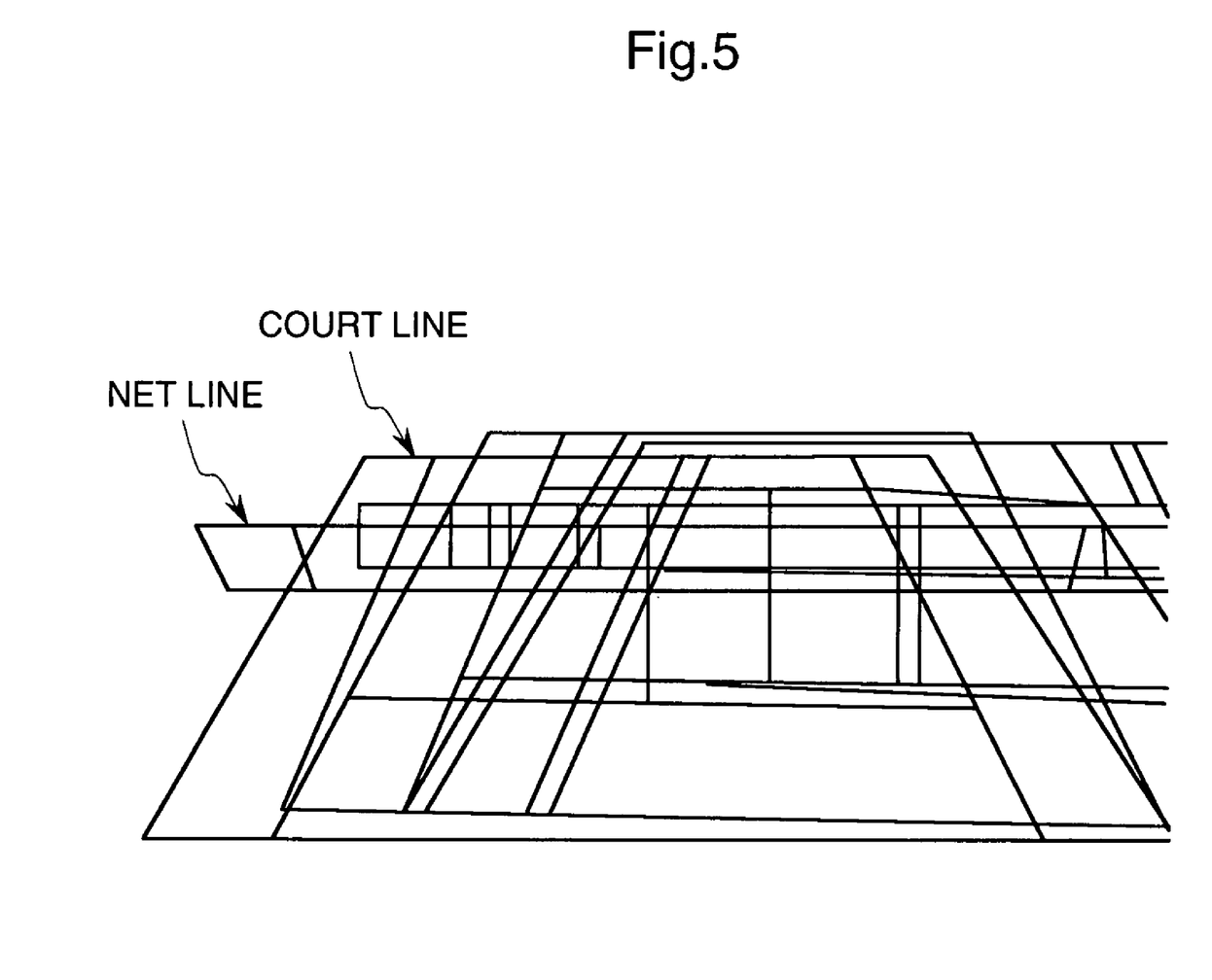
FIG. 5 is a diagram illustrating the court lines and net lines extracted from picture information according to the embodiment.

In this way the court lines and the net lines can be extracted as shown in FIG. 5.

In turn, the player's position information is extracted by specifying a domain in which overlapping is maximum in binary images formed by removing the court lines and the net lines from the picture image.

Figure 6:
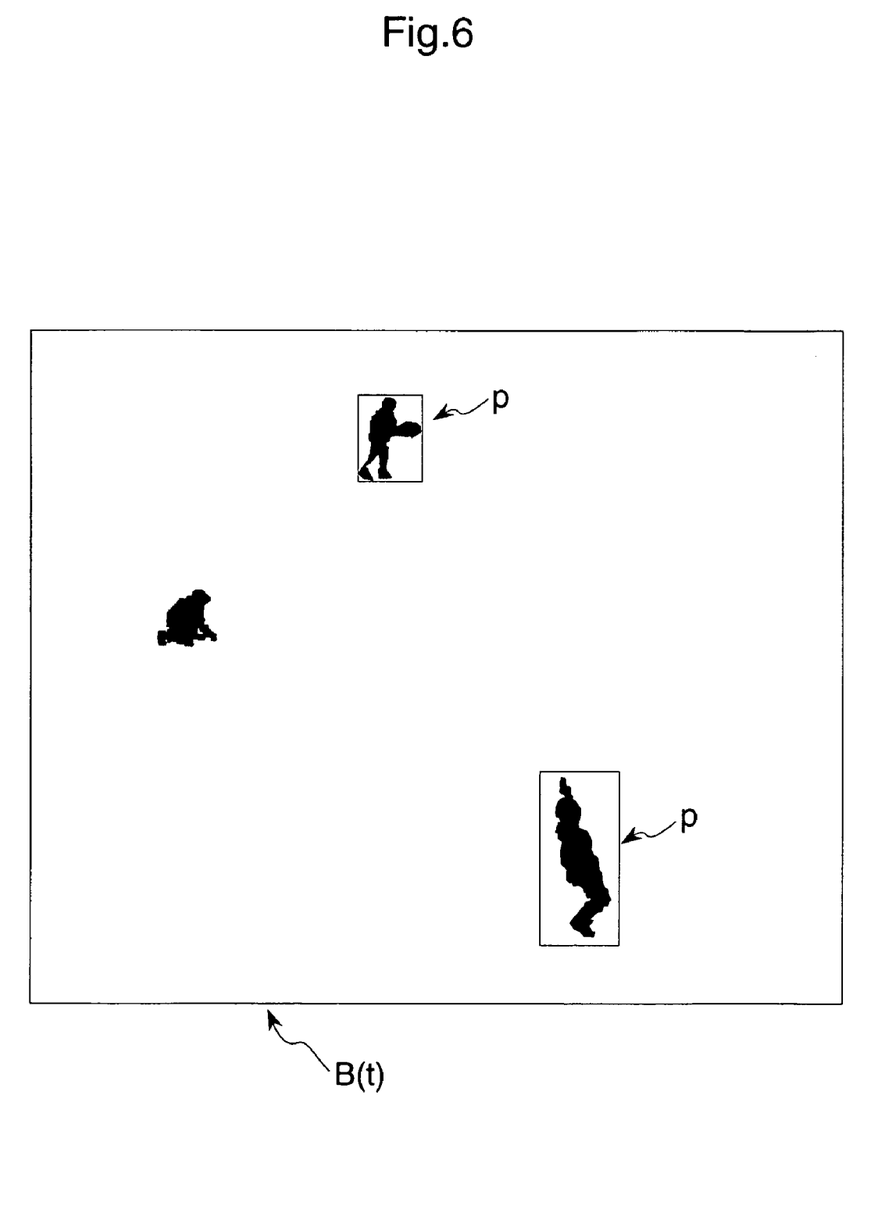
FIG. 6 is an illustration of a player's domain detected according to the embodiment.

More specifically, at a point in time t=t, differences from images that are forwardly and backwardly apart from an image of concern by s frames are found to generate binary images $B_1(t)$ and $B_2(t)$ using appropriate threshold values. Here, $B_1(t)=BIN(I(t)-I(t-s))$, and $B_2(t)=BIN(I(t+s)-I(t))$, wherein BIN is a function making the parenthesized factor binary. Based on a binary image $B_{diff}(t)$ resulting from an AND operation on these two difference images and a binary image $B_{label}(t)$ in which those points on an image I(t) at a point in time t=t which are included in a color cluster corresponding to a predetermined representative color of, for example, a players' uniform are each defined as 1, the court lines and the net lines are erased. Further, a domain from which a portion overlapping the player's domain is considered to have been removed is compensated for through expansion/compression processing. The two images thus obtained are ORed to give a binary image B(t) as shown in FIG. 6. A connected domain within the binary image B(t) thus obtained is labeled and the thus labeled domain is observed throughout several frames to avoid influence of noise. Such a domain in the area covering the court and the area therearound is determined as a player's initial position if the domain has an area larger than a predetermined value. Of such domains each having an area larger than the predetermined value at the point in time t=t, those domains each of which is located adjacent a player's domain at a point in time t=t−1 and has the smallest difference in area from the latter player's domain is judged as a player's domain p, thereby providing player's position information.

By switching between a detection mode and a trace mode in accordance with the distance from the player's position given by the player's position information thus extracted, the ball is extracted.

Figure 7:
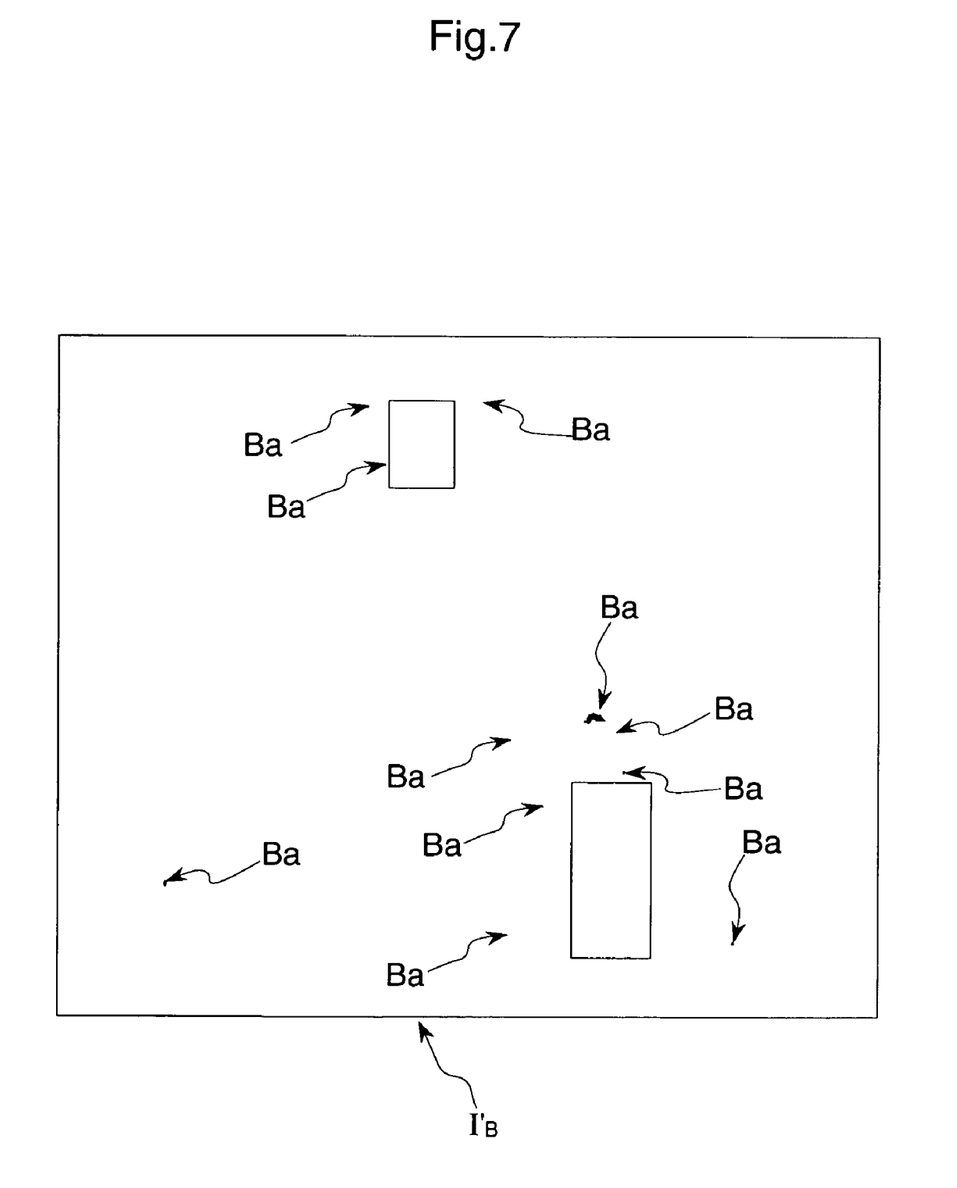
FIG. 7 is an illustration of a ball domain detected according to the embodiment.

More specifically, the detection mode is a mode for detecting all ball prospect positions each matching a predetermined template $T_b(x,y)$ in a domain around each player within an image $I'_B$ from which the players' positions P have been erased at the point in time t with use of the template $T_b(x,y)$ provided with a ball size of $b_x \times b_y$, as shown in FIG. 7. Likewise, ball prospects at points of time t=t+1, t+2, . . . are detected and series of ball prospects Ba which are detected to be radially consecutive from about a player's position are chosen and the number of such series of ball prospects Ba is reduced by selection to find a single series of ball prospects Ba. The finally selected series of ball prospects Ba can be specified as a ball trajectory BW within a time segment of concern. The template $T_b(x,y)$ is a kind of tool provided for extracting the ball from the picture information. In this embodiment the size of the ball to be displayed as expanded or compressed is provisionally established as $b_x \times b_y$ and a periphery slightly expanded outwardly from $b_x \times b_y$ is established as the template.

The trace mode is a mode for tracing the ball trajectory BW by template matching with the template $T_b(x,y)$. In this mode, tracing is conducted using as the center of estimation a position obtained by adding an amount of move detected last time directly to a current frame on the assumption that ball trajectory BW within a very short period of time can be considered to be substantially straight. When the distance between a player's domain and the position of a ball prospect Ba becomes smaller than a certain threshold value, the trace mode is switched to the detection mode. If not, the trace mode operation is repeatedly conducted.

Figure 8:
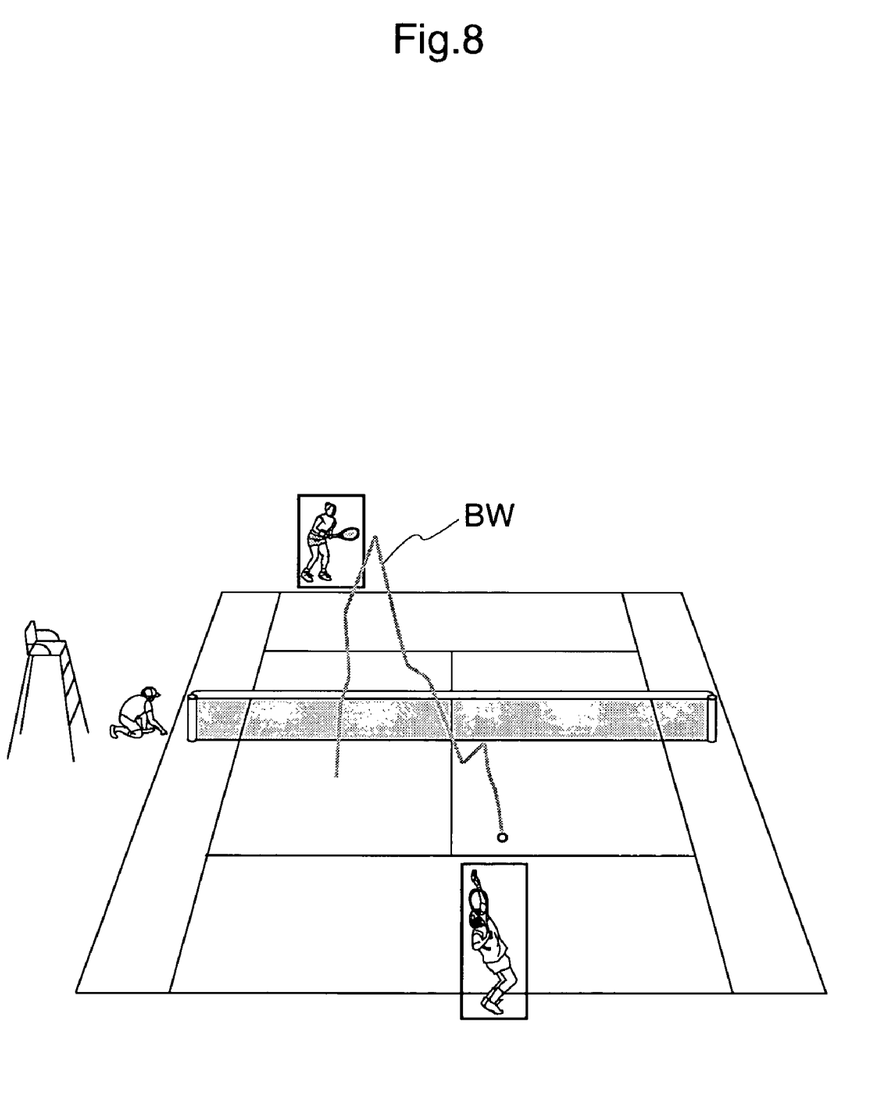
FIG. 8 is an illustration of a trace of a ball position.

In this way, the ball trajectory BW within a desired time segment can be obtained as shown in FIG. 8. Note that the ball trajectory BW is superimposed on picture information obtained at a desired point in time in FIG. 8 for convenience in showing the ball trajectory BW.

Figure 9:
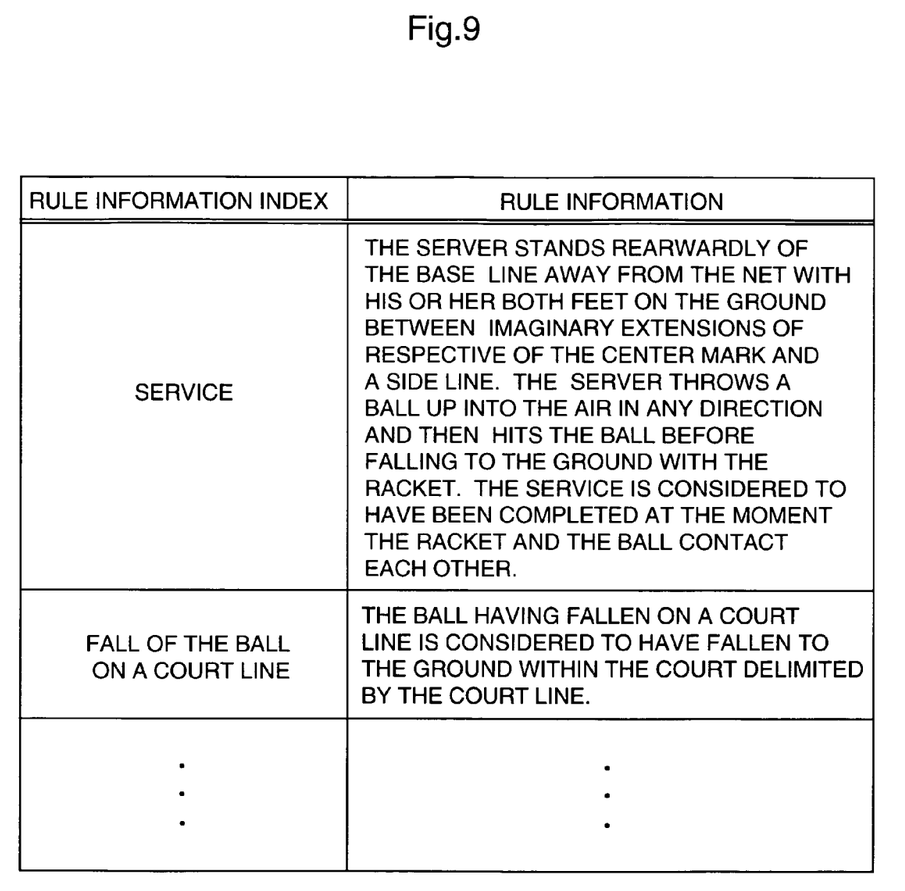
FIG. 9 is an illustration of a manner of storage by a rule information storage section of the embodiment.

The rule information storage section 102 is configured to store rule information required for carrying out a sport of concern and is provided in a predetermined area of the external storage device 12 or internal memory 13. More specifically, as shown in FIG. 9, the rule information includes rule information items defining respective rule information indexes including, for example, a rule information index "service" defined by the description that "the server stands rearwardly of the base line away from the net with his or her both feet on the ground between imaginary extensions of respective of the center mark and a side line. The server throws a ball up into the air in any direction and then hits the ball before falling to the ground with the racket. The service is considered to have been completed at the moment the racket and the ball contact each other.", and a rule information index "fall of the ball on a court line" defined by the description that "the ball having fallen on a court line is considered to have fallen to the ground within the court delimited by the court line.

The sound information obtaining section 103 is configured to obtain sound information containing a hitting sound generated upon hitting of the ball and like sound from the contents by sampling the sound information at a resolving power of 16 bits and a sampling grade of 44.1 kHz. In this embodiment, the sound information obtaining section 103 is provided with a filter portion not shown for advantageously extracting only the hitting sound by filtering off sound information other than the hitting sound including a sound generated when the shoes of a player rub the court during play, sound of wind and other noises. More specifically, the filter portion comprises a band-pass filter for permitting sound within a predetermined frequency band to pass therethrough, the band-pass filter comprising a digital circuit such as a FIR filter, IIR filter or the like. In this embodiment, the band-pass filter is configured to permit signal components within a frequency band of 100 to 1500 Hz to pass therethrough.

The hitting sound pattern information storage section 104 is configured to store information on patterns of sound changes that occur depending on how the instrument is hit by a racket which are categorized according to hitting sounds generated by different sorts of strokes such as a smash and a forehand stroke, as hitting sound pattern information by connecting each of the patterns with a predetermined frequency and an amplitude at this frequency. The hitting sound pattern information storage section 104 is provided in a predetermined area of the external storage device 12 or internal memory 13. The hitting sound pattern information storage section 104 may be configured to store patterns of sound other than the sound generated upon hitting of a ball with a racket, for example, sound generated upon a bounce of a ball on the court.

The hitting time information specifying section 105 is configured to specify a hitting time based on the hitting sound pattern information stored in the hitting sound pattern information storage section 104 and the sound information obtained by the sound information obtaining section 103.

More specifically, the hitting time information specifying section 105 performs FFT processing on the sound information obtained by the sound information obtaining section 103 with its start time being shifted on a 2048 point (≈0.046 sec) basis at intervals of 128 points (≈0.029 sec) and checks a frequency characteristic pattern of a sound information item converted to a frequency region at each point in time against hitting sound pattern information items stored in the hitting sound pattern information storage section 104. If the frequency characteristic pattern of the sound information item is found to match with a hitting sound pattern information item as a result of the checking, the hitting time information specifying section 105 specifies as ball hitting time $t_a$ the point in time at which the sound information item having the frequency characteristic pattern matching with the hitting sound pattern information item is generated and then outputs the hitting time $t_a$ thus specified to the image substance recognizing section 106. In this embodiment the hitting time information specifying section 105 is designed to use a correlation function in checking the matching between the frequency characteristic pattern of a sound information item and a hitting sound pattern information item, and if the correlation function is larger than a predetermined threshold value, the frequency characteristic pattern of the sound information item and the hitting sound pattern information item are considered to match with each other.

The image substance recognizing section 106 is configured to recognize the substance of an image containing a player's movement provided by the picture information based on the court lines and net lines and player's position information extracted by the domain element extracting section 101, the position of the instrument at the hitting time $t_a$ specified by the hitting time information specifying section 105 and the rule information stored in the rule information storage section 102.

Figure 10:
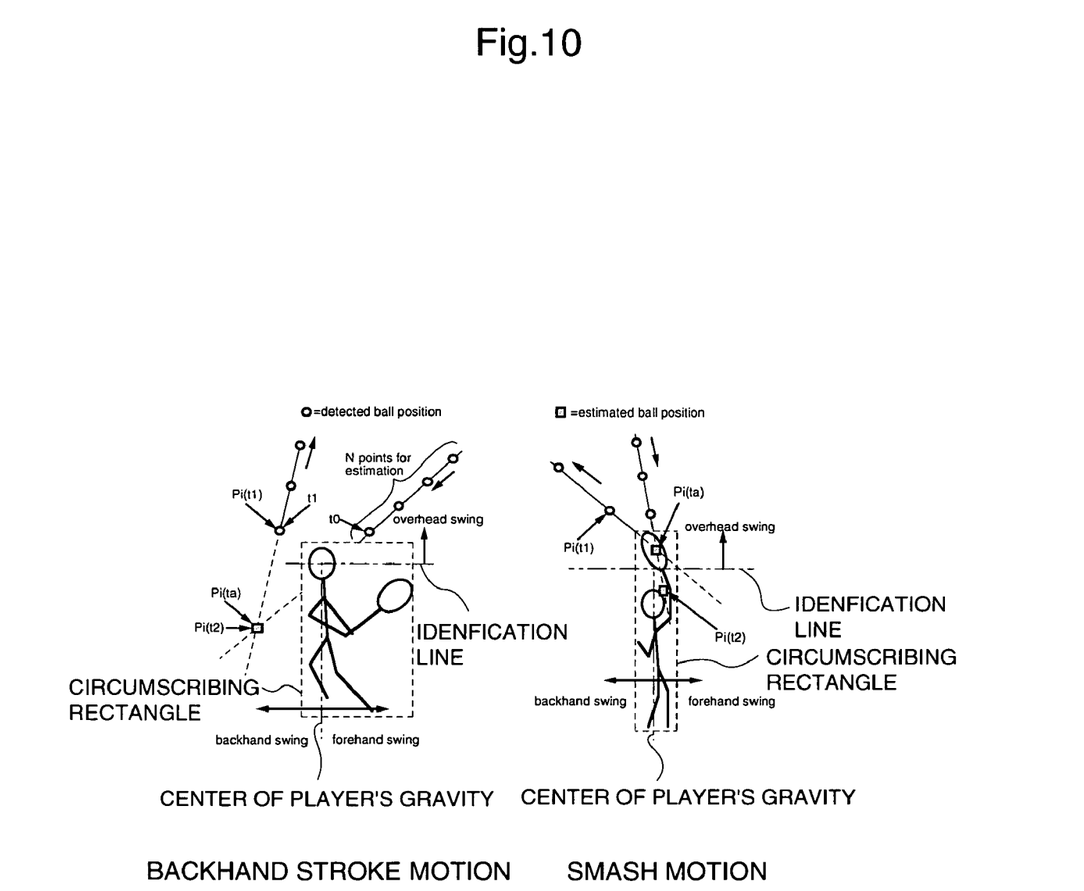
FIG. 10 is an illustration of a manner of identifying player's movements according to the embodiment.

More specifically, as shown in FIG. 10, ball position $P_i(t_a)$ at specified hitting time ($t_a$) is determined by estimating an appropriate trajectory from the last detected ball position or N points following the last detected ball position. From the ball position $P_i(t_a)$ thus determined and a player's position, a player's movement is identified. For example, if the ball is above an identification line extending through an upper portion of a rectangle circumscribing a player hitting the ball at the hitting time $t_a$, the movement of the player is identified as "overhead_swing", while if the ball is on the foreside or backside with respect to the center of gravity of the player, the movement of the player is identified as "forehand_swing" or "backhand_swing". The identification line is established to extend through an upper portion of a player's domain determined by a fixed proportion to the vertical length of the player's circumscribing rectangle.

Figure 11:
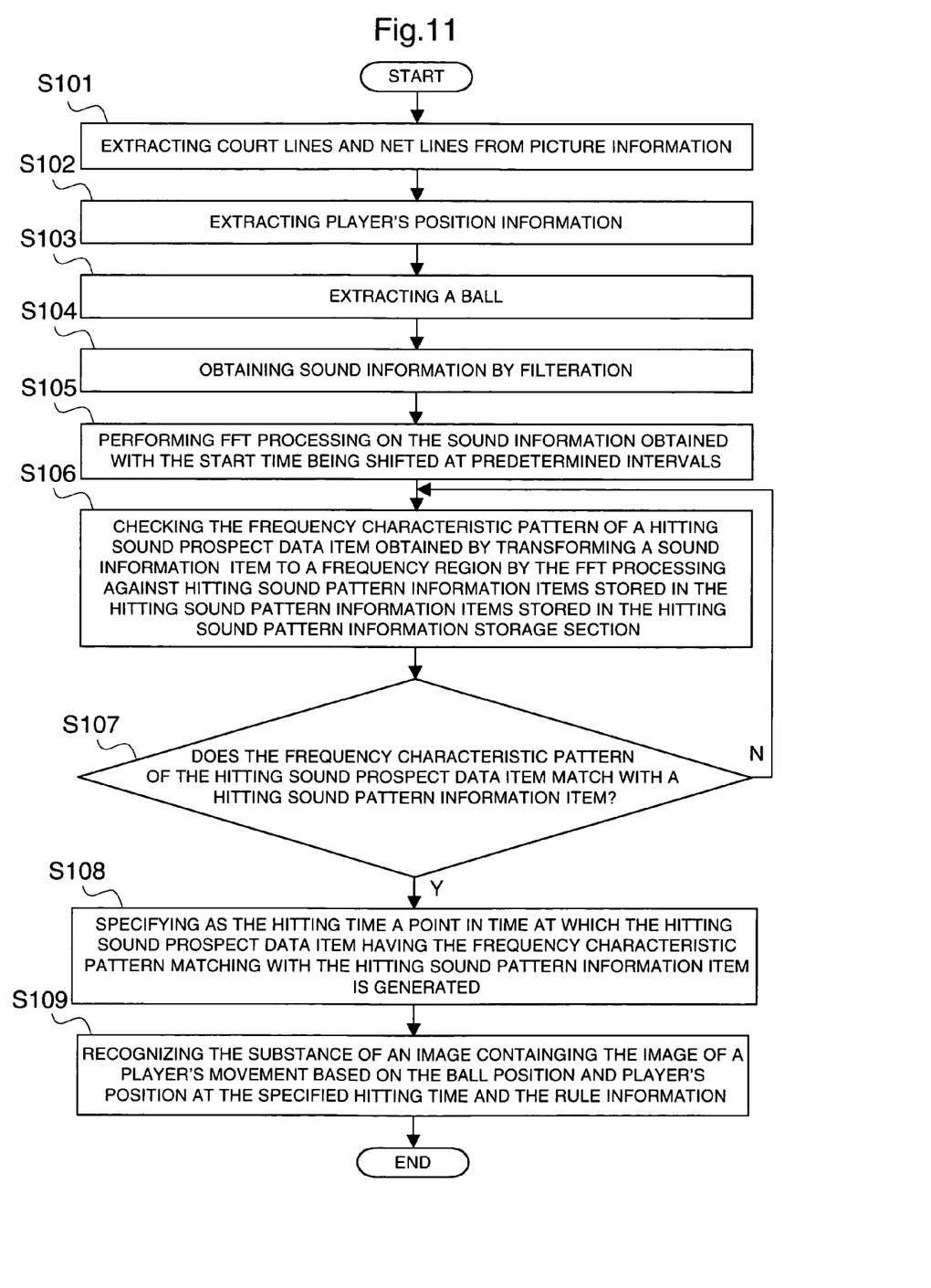
FIG. 11 is a flowchart showing a process of image recognition from picture information according to the embodiment.

Next, the operation of the image recognition apparatus according to this embodiment will be described with reference to the flowchart at FIG. 11.

Initially, court lines and net lines are extracted from picture information containing images of movements of the players during play (step S101). Player's position information is extracted from the picture information using a binary image formed by removing the court lines and the net lines from the picture information (step S102). Based on the player's position information thus extracted, a ball is extracted from the picture information (step S103). Subsequently, sound information containing a hitting sound generated upon hitting of the ball is obtained by filtering the sound information with the filter portion (step S104). The FFT processing is performed on the filtered sound information thus obtained with the start time being shifted at predetermined intervals (step S105). The frequency characteristic pattern of a hitting sound prospect data item obtained at each point in time by transforming a sound information item to a frequency region by the FFT processing is checked against hitting sound pattern information items stored in the hitting sound pattern information storage section 104 (step S106). If the frequency characteristic pattern of the hitting sound prospect data item is found to match with a hitting sound pattern information item according to the result of the checking (step S107), the point in time at which the hitting sound prospect data item having the frequency characteristic pattern matching with the hitting sound pattern information item is generated is specified as ball hitting time $t_a$ (step S108). If the frequency characteristic pattern of the hitting sound prospect data item is found not to match with the hitting sound pattern information item (step S107), the frequency characteristic pattern of a hitting sound prospect data item generated at the next point in time is checked against the hitting sound pattern information items (step S106). Based on the ball position and player's position at the specified hitting time and the rule information, three movements, i.e., "forehand_swing" indicative of a forehand swing motion, "backhand_swing" indicative of a backhand swing motion and "overhead_swing" indicative of an overhead swing motion, can be recognized as shown in FIG. 10 even when inconveniences occur in image recognition, for example, such an inconvenience that the ball is overlapped or hidden by a player (step S109).

As described above, even when image recognition based on the picture information only is difficult; for example, when the position of the instrument is difficult to specify due to the instrument overlapped or hidden by a player or such an obstacle as net in a picture, the hitting time information specifying section specifies the hitting time at which a hitting sound is generated based on the sound information including information on the hitting sound obtained by the sound information obtaining section and then the image substance recognizing section identifies a player's movement reliably based on the specified hitting time, the picture information containing the image of the player's movement during play and the rule information for carrying out the rules of the sport match or game. Thus, it is possible to provide a relatively inexpensive image recognition apparatus which is excellent in image recognition ability and which is capable of preventing such a recognition error as has been impossible to prevent in image recognition based the picture information only, for example, errors in identifying a forehand swing, a backhand swing and an overhead swing due to the instrument overlapped or hidden. It is needless to say that the image recognition apparatus is capable of advantageous image recognition even when the ball and a player are not overlapped or hidden by each other.

Even though the obtained sound information contains noise other than hitting sound, the filter portion is capable of filtering off such noise. For this reason, robust image recognition with a high recognition rate is possible.

Since the hitting time information specifying section is configured to obtain plural hitting sound prospect data items from the sound information and specify a hitting time based on these hitting sound prospect data items, the hitting time can be specified exactly. Further, the hitting time information specifying section is configured to obtain the plural hitting sound prospect data items in such a manner that a hitting sound prospect data item generated at one point in time and another hitting sound prospect data item generated at an immediately preceding or succeeding point in time share data on a same time. Accordingly, it is possible to obviate a failure to specify a hitting time.

In this embodiment, a tennis program is used as an exemplary one of the contents, while facility information as a domain element to be extracted from the picture information on the tennis program includes information on court lines and information on net lines. It is, however, needless to say that if the contents change from the tennis program to another sport program or the like, the facility information to be extracted changes also. Similarly, the player's position information and the instrument information also change.

This embodiment is configured to recognize characteristic movements of players playing in a sport match or game from sports contents including a television program being telecasted on a television receiver TV or being reproduced by a recording/reproducing device such as a VTR, and such contents as recorded in a recording medium. However, media through which contents as a subject for image recognition are provided are not limited to those used in this embodiment. For example, it is possible to recognize characteristic movements of players playing in a sport match or game from image materials which have been just taken from the sport match or game at a stadium and hence are in an uncompleted state for broadcasting or from archived picture information on Internet.

While the image substance recognizing section 106 is configured to recognize the three movements, i.e., "forehand_swing" indicative of a forehand swing motion, "backhand_swing" indicative of a backhand swing motion and "overhead_swing" indicative of an overhead swing motion as the substance of an image containing a player's movement provided by the picture information, the image substance recognizing section 106 may be configured to recognize "stay" indicative of a staying movement of a player on the spot and "move" indicative of a move of a player based on the relation between the ball position and the player's position or like relation. If the rule information to be stored in the rule information storage section 102 includes more complicated definitions including definitions of various player's movements, the image substance recognizing section 106 will be capable of recognizing more complicated player's movements.

While this embodiment is configured to extract a ball from picture information using the predetermined template $T_b(x,y)$ having a ball size of $B_x \times B_y$, the ball may be extracted without using the template.

While the sound information obtaining section 103 is provided with the filter portion comprising a band-pass filter, an embodiment of sound information obtaining section 103 employing a filter other than the band-pass filter is possible. Further, there is no limitation to the frequency band of 100 to 1500 Hz to be permitted to pass through the filter portion.

The sound information obtaining section 103 is configured to obtain sound information containing a hitting sound generated upon hitting of the ball and like sound from the contents by sampling the sound information at a resolving power of 16 bits and a sampling grade of 44.1 kHz. However, there is no particular limitation to these values of respective of the resolving power and the sampling grade.

In this embodiment the hitting time information specifying section 105 is configured to perform FFT processing on the sound information obtained by the sound information obtaining section 103 with its start time being shifted on a 2048 point ($\approx$0.046 sec) basis at intervals of 128 points ($\approx$0.029 sec). However, the numbers of such points for use in the FFT processing may vary without limitation to these numbers.

In this embodiment the hitting time information specifying section 105 is designed to use a correlation function in checking the matching between the frequency characteristic pattern of a sound information item and a hitting sound pattern information item, and if the correlation function is larger than the predetermined threshold value, the frequency characteristic pattern of the sound information item and the hitting sound pattern information item are considered to match with each other. It is, however, possible to employ other methods of checking the matching between the frequency characteristic pattern of a sound information item and a hitting sound pattern information item.

The specific features of other sections or parts are not limited to this embodiment but may be modified variously without departing from the concept of the present invention.

INDUSTRIAL APPLICABILITY

According to the present invention having been described above, even when image recognition based on picture information only is difficult; for example, when the position of an instrument used in a sport match or game is difficult to specify due to the instrument overlapped or hidden by a player or by such an obstacle as net, the hitting time information specifying section specifies the hitting time at which a hitting sound is generated based on sound information including information on the hitting sound obtained by the sound information obtaining section and then the image substance recognizing section identifies a player's movement reliably based on the specified hitting time, the picture information containing the image of the player's movement during play and the rule information for carrying out the rules of the sport match or game. Thus, it is possible to provide a relatively inexpensive image recognition apparatus which is excellent in image recognition ability and which is capable of preventing such a recognition error as has been impossible to prevent in image recognition based on the picture information only, for example, errors in identifying a forehand swing, a backhand swing and an overhead swing due to the instrument overlapped or hidden.

The invention claimed is:

1. An image recognition apparatus for recognizing movements of players matched against each other between domains partitioned with such an obstacle as net in a sport match or game from contents including a television program being telecasted to show the sport match or game, an image material in an uncompleted state for broadcasting and contents recorded in a recording medium, the image recognition apparatus comprising: a picture information obtaining section configured to obtain picture information containing an image of a movement of at least one of the players playing in the sport match or game from the contents; a sound information obtaining section configured to obtain sound information generated in synchronism with the picture information from the contents, the sound information including information on a hitting sound generated upon hitting of an instrument moving between the domains to serve as an object of score count in the sport match or game; a hitting time information specifying section configured to specify a hitting time at which the instrument is hit based on the sound information obtained by the sound information obtaining section; a rule information storage section configured to store rule information for carrying out the sport match or game; and an image substance recognizing section configured to recognize a substance of an image containing the image of the movement of the player provided by the picture information based on the picture information obtained by the picture information obtaining section, a position of the instrument at the hitting time specified by the hitting time specifying section and the rule information stored in the rule information storage section.

2. The image recognition apparatus according to claim 1, wherein when the sound information assumes a value higher than a predetermined level, the hitting time information specifying section specifies as the hitting time a point in time at which the higher value is assumed.

3. The image recognition apparatus according to claim 1, wherein: the sound information obtaining section is provided with a filter portion configured to permit sound within a predetermined frequency band to pass therethrough; and the sound information is information on the sound having passed through the filter portion.

4. The image recognition apparatus according to claim 3, wherein the filter portion comprises a band-pass filter.

5. The image recognition apparatus according to claim 1, wherein the hitting time information specifying section is configured to specify the hitting time based on hitting sound prospect data including data on a predetermined time period within which the hitting sound extracted from the sound information is generated.

6. The image recognition apparatus according to claim 1, wherein the hitting time information specifying section is configured to extract plural hitting sound prospect data items from the sound information in such a manner that a hitting sound prospect data item generated at one point in time and a subsequent hitting sound prospect data item generated at a succeeding point in time share data on a same time and then specify the hitting time based on the plural hitting sound prospect data items.

7. The image recognition apparatus according to claim 6, wherein the plural hitting sound prospect data items have equal data length, while the hitting time information specifying section is configured to extract the plural hitting sound prospect data items from the sound information at constant time intervals.

8. The image recognition apparatus according to claim 1, further comprising a hitting sound pattern information storage section configured to store hitting sound pattern information including information on patterns of sound changes that occur depending on how the instrument is hit by such an instrument as a racket constantly held and used by each of the players, wherein the hitting time information specifying section is configured to specify the hitting time based on the hitting sound pattern information stored in the hitting sound pattern information storage section and the sound information.

9. The image recognition apparatus according to claim 1, wherein the picture information obtaining section includes a domain element extracting section configured to extract from the picture information facility information including information on the obstacle, information on the domains and information on boundary lines between each of the domains and an area outside the domain, player's position information indicative of a player's position, and instrument information on the instrument moving between the domains to serve as an object of score count in the sport match or game.

10. The image recognition apparatus according to claim 9, wherein the player's position information is position information on a domain containing each of the players and the instrument constantly held and used by the player.

11. The image recognition apparatus according to claim 10, wherein the domain element extracting section is configured to extract the player's position information from the picture information based on the facility information extracted by the domain element extracting section.

12. The image recognition apparatus according to claim 9, wherein the domain element extracting section is configured to extract the instrument information from the picture information based on the facility information and the player's position information extracted by the domain element extracting section.

13. The image recognition apparatus according to claim 9, wherein the facility information, the player's position information, the instrument information and the rule information are based on knowledge about a sport as a subject for image extraction.

14. An image recognition program stored on a computer readable medium cooperative with a computer for causing an image recognition apparatus to operate to recognize movements of players matched against each other between domains partitioned with such an obstacle as net in a sport match or game from contents including a television program being telecasted to show the sport match or game, an image material in an uncompleted state for broadcasting and contents recorded in a recording medium, the image recognition program being configured to cause the image recognition apparatus to function as: game from the contents; a sound information obtaining section configured to obtain sound information generated in synchronism with the picture information from the contents, the sound information including information on a hitting sound generated upon hitting of an instrument moving between the domains to serve as an object of score count in the sport match or game; a hitting time information specifying section configured to specify a hitting time at which the instrument is hit based on the sound information obtained by the sound information obtaining section; a rule information storage section configured to store rule information for carrying out the sport match or game; and an image substance recognizing section configured to recognize a substance of an image containing the image of the movement of the player provided by the picture information based on the picture information obtained by the picture information obtaining section, a position of the instrument at the hitting time specified by the hitting time specifying section and the rule information stored in the rule information storage section.

* * * * *